United States Patent [19]

Lippold

[11] Patent Number: 4,895,357
[45] Date of Patent: Jan. 23, 1990

[54] LIGHTTIGHT FILM-DELIVERY BOX AND ACTUATOR APPARATUS THEREFOR

[75] Inventor: Steven R. Lippold, Oakfield, N.Y.

[73] Assignee: Eastman Kodak Company, Rochester, N.Y.

[21] Appl. No.: 304,094

[22] Filed: Jan. 31, 1989

[51] Int. Cl.⁴ ............................................... B65H 7/00
[52] U.S. Cl. ...................................... 271/8.1; 271/42; 271/145; 271/162; 378/173
[58] Field of Search ................... 271/8.1, 42, 162, 164, 271/145, 147, 207, 213, 214; 378/188, 173; 354/319

[56] References Cited

U.S. PATENT DOCUMENTS

| | | | |
|---|---|---|---|
| 3,153,145 | 10/1964 | Yerkovich | 378/188 |
| 3,271,571 | 9/1966 | Klem et al. | |
| 3,842,282 | 10/1974 | Shimoda et al. | 378/188 |
| 4,227,089 | 10/1980 | Plessers et al. | 378/188 |
| 4,365,793 | 12/1982 | Blokland et al. | |

FOREIGN PATENT DOCUMENTS 0203930 10/1985 Japan .................................. 378/188

Primary Examiner—H. Grant Skaggs
Attorney, Agent, or Firm—Dennis P. Monteith

[57] ABSTRACT

A lighttight box includes a lid movable between a first lighttight position and a second box-opening position. A clamshell film-carrying mechanism, connected to the lid, is mounted for movement (1) for a retracted position internal to the box when the lid is in its lighttight position, to (2) an extracted film-delivery position external to the box when the lid is in its box-opening position. Actuator apparatus includes a lift mechanism, attachable to the lid when the box is in a parked film-delivery position relative to a workstation, movable between a rest position in which the lid is held in its closed position, and an actuated position in which the lid is held in its box-opening position. A motor, coupled to the lift mechanism, serves for driving the lift mechanism between its rest and actuated positions.

4 Claims, 8 Drawing Sheets

LIGHTTIGHT FILM-DELIVERY BOX AND ACTUATOR APPARATUS THEREFOR

CROSS-REFERENCE TO A RELATED APPLICATION

Reference is hereby made to U.S. patent application Ser. No. 304,085 filed Jan. 31, 1989 in the names of M. Branca et al and entitled A LIGHTTIGHT FILM-DELIVERY BOX.

BACKGROUND OF THE INVENTION

1. Field Of The Invention

The present invention relates generally to apparatus for handling sheet material. More particularly, the invention relates to a lighttight box and actuator apparatus therefor for automatically delivering a photosensitive sheet to a workstation.

2. Description Of The Related Art

Many applications require the delivery of a flexible photosensitive sheet to a workstation, for example an exposure station. Apparatus, such as an electrostatic copier, a facsimile machine, color image reproduction apparatus, etc., often employs an exposure station in the form of a drum-type mechanism that automatically receives a photosensitive sheet of paper or film for an exposing operation.

Prior to an exposure, a photosensitive sheet needs to be handled in the dark or at least a low-light environment. A lack of light can be particularly troublesome to an operator during a loading operation, particularly if a photosensitive sheet is required to be mounted precisely for an exposure. This problem is alleviated significantly if the operator is required merely to place the photosensitive sheet into a lighttight sheet-delivery box or the like, which then delivers the sheet to a precise position at an exposure station. An operator can accomplish the initial sheet-loading task with relative ease when there is no need for precision placement of the sheet in the box other than a general alignment and orientation, i.e. width versus length and proper side up.

SUMMARY OF THE INVENTION

In view of the foregoing, an object of the invention is to provide apparatus for automatically delivering a photosensitive sheet to a precise position on a workstation in a manner that obviates the need for precision placement of the sheet by an operator.

This object is achieved by the combination of a lighttight box for carrying a photosensitive sheet and cooperating box-actuating apparatus for automatically presenting the sheet in a predetermined reference position (alignment, orientation, etc.) to a workstation. The box is of the type having a lid movable between a closed lighttight position and an open position. A tray carries the sheet with its light-sensitive surface facing outwardly, away from the tray. A linkage, coupling the tray and the lid, is hinged to the tray to cooperatively form the jaws of a clamshell-like mechanism that traps the enclosed sheet in an arch-like configuration.

The actuator apparatus includes a lift mechanism, attachable to the lid when the lighttight box is placed in a parked sheet-delivery position relative to a workstation. A motor, including an output coupled to the lift mechanism, causes its output to move the lift mechanism to an actuated position in which the lid is held in its open position. As the box opens, the lid pulls the clamshell mechanism to a position external to the box wherein a leading peripheral edge of the sheet is fed into a leading-edge clamp of the workstation which then loads the remainder of the sheet into the workstation.

By arching the sheet, the full leading edge of the sheet can be moved more readily into abutting engagement with a receiving surface of the workstation if the sheet is misaligned on delivery; furthermore, by arching the sheet, a somewhat greater tolerance can be permitted for parking the sheet-delivery box a given distance from the workstation when the sheet is actually delivered to the workstation. These advantages, as well as other advantages will become more apparent in the detailed description of a preferred embodiment presented below.

BRIEF DESCRIPTION OF THE DRAWINGS

The invention will be described with reference to the accompanying drawings, wherein.

DETAILED DESCRIPTION OF A PREFERRED EMBODIMENT

Figure 1:
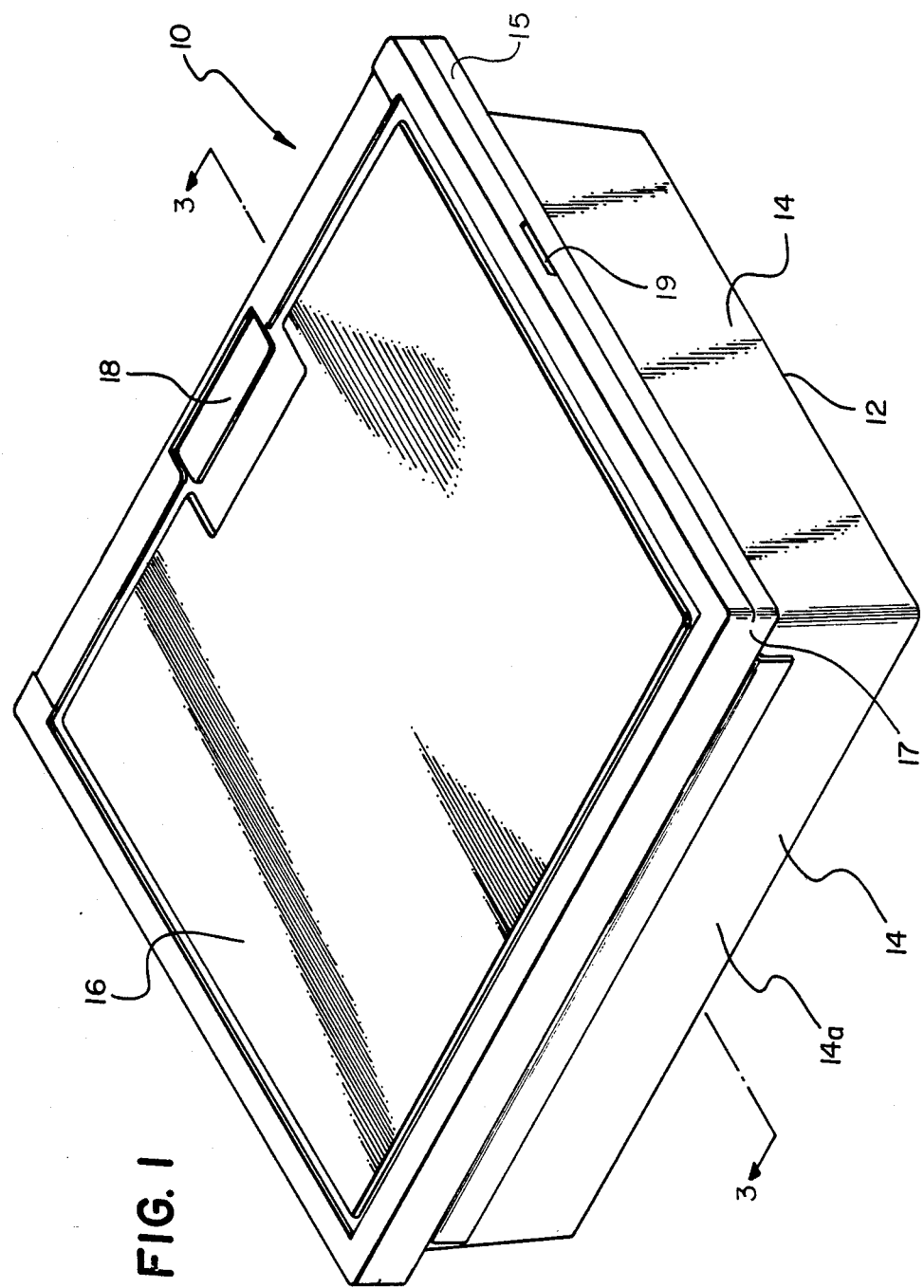
FIG. 1 is a perspective view of a lighttight box, in accordance with the invention, in a closed position.

FIG. 1 shows a locked lighttight box 10 in a closed lighttight position. The box 10 serves preferably for transporting a photosensitive sheet of photographic film, of a size approximately 20 by 25 centimeters. For that purpose, the box 10 forms a rigid rectangular receptacle having a flat bottom 12, four upright sides 14 terminating at a peripheral rim 15, and a lid 16 aligned with the rim. A plastic molding, surrounding a peripheral edge of the lid 16, forms a living hinge 17 with the portion of the rim 15 that is adjacent the top of rearwardly facing side 14a.

A pivotal handle 18, located in a recess toward a forwardly facing edge of the lid 16, enables an operator to unlock the lid for placing a film sheet into, or removing the sheet from, the box 10. A pair of recesses 19, located on opposing sides of the lid 16, serves to permit box-actuating apparatus, described in detail hereinafter, to attach to the lid.

Figure 2:
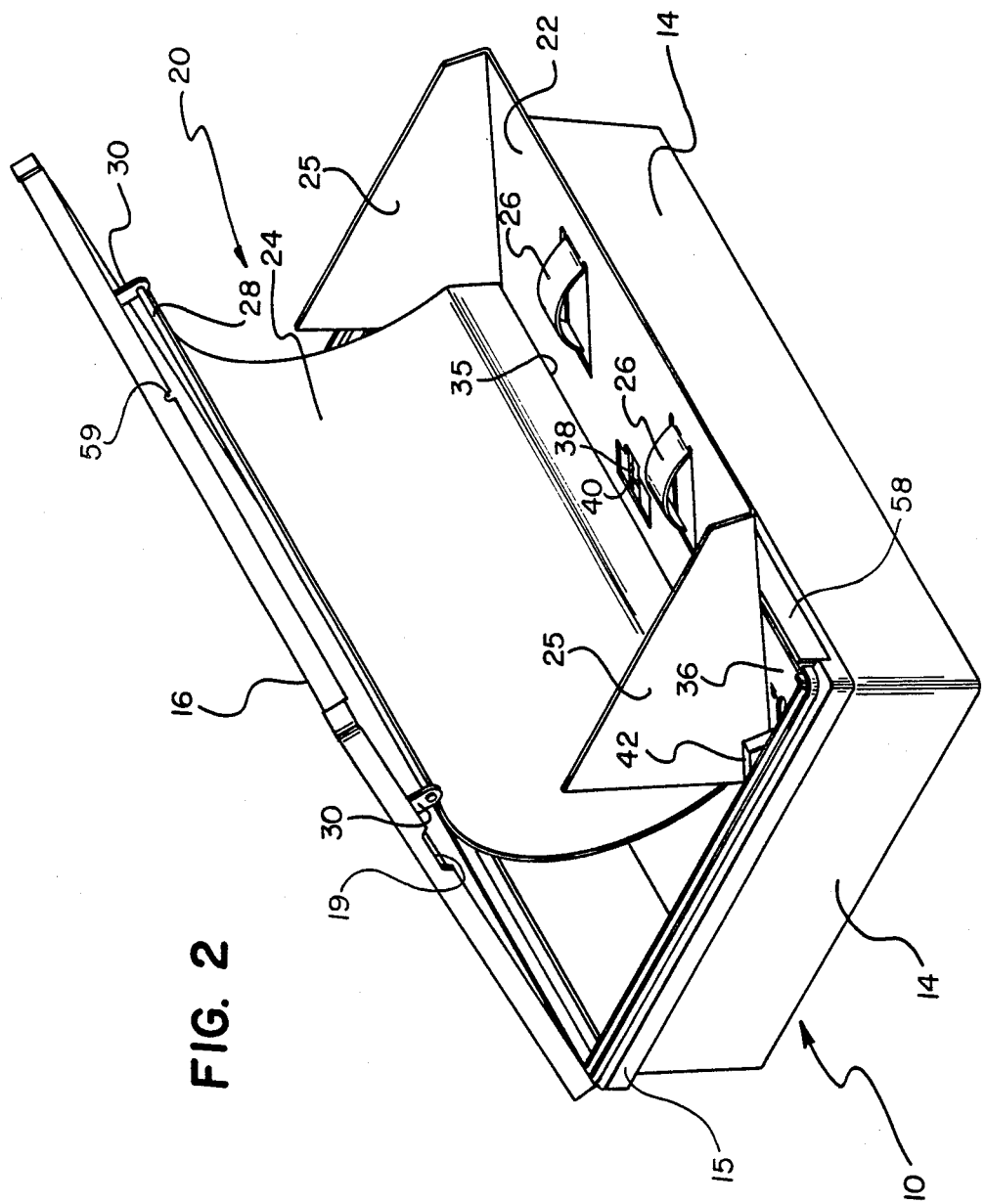
FIG. 2 is a perspective view of the lighttight box in an open position.

FIG. 2 shows the lid 16 in an open position. In its open position, the lid 16 uncovers a clamshell chute 20 which serves for delivering a film sheet to, or receiving the sheet from, a workstation. An open-faced film-carrying tray 22 and a cooperating gently curved backing plate 24 form the respective jaws of the clamshell.

The tray 22 is made preferably of sheet metal. Opposite ends of the metal sheet are folded upwardly to form a pair of wing-like retaining sides 25 for centering a film sheet on the tray 22. A pair of curved rectangular bumps 26 serves, for a reason made apparent hereinafter, to lift a forwardly facing peripheral edge of film when the box 10 is open.

The backing plate 24, which is nested between the sides 25, functions as a linkage coupling the lid 16 and the tray 22. To that end, a metal rod 28, preferably welded to the back of the plate 24 along its forwardly facing peripheral edge, serves as a hinge coupling the curved plate to the lid 16. For that purpose, opposing ends of the rod 28 are rotatably received in rounded holes formed in tabs 30 extending downwardly from opposite sides of the lid 16.

Figure 3:
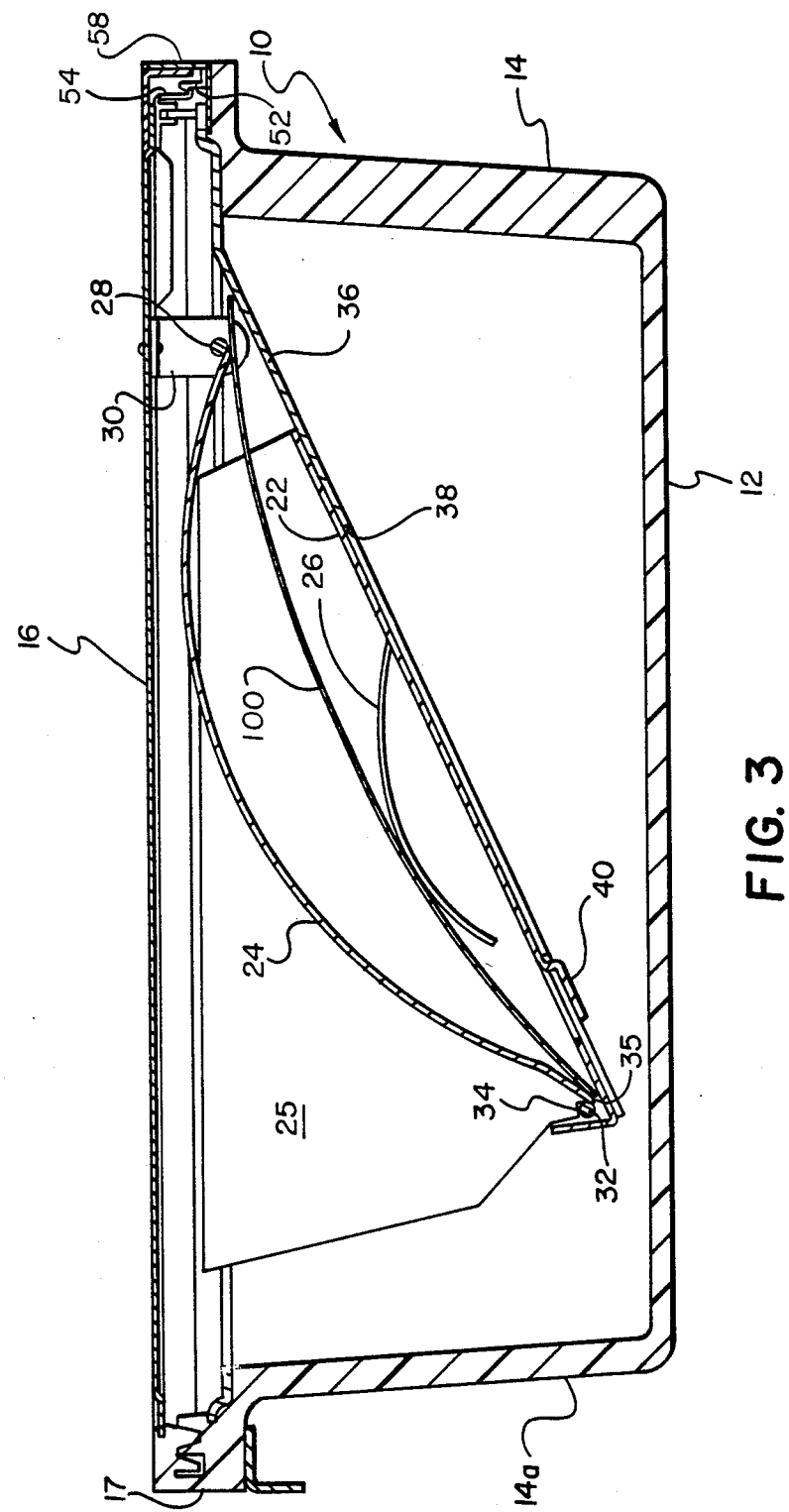
FIG. 3 is a cross-sectional view of the box taken along the line 3—3 of FIG. 1.

FIG. 3 shows a rod 32, which is welded to the back of the plate 24 along its downwardly or rearwardly facing edge. The rod 32, like the rod 28, serves as a hinge, only coupling the backing plate 24 to the tray 22. To that end, opposing ends of the rod 32 are rotatably seated in respective notches 34 cut from the lower rear corners of the sides 25 of the tray 22. In doing so, the backing plate 24 and the tray 22 cooperatively form an elongate film trap 35 extending laterally along the lower back corner of the chute 20.

FIG. 3 further shows the box 10 as having a stationary member 36 extending from the top front rim of the box linearly downwardly toward the lower back corner of the box. The member 36 functions as a ramp upon which the tray 22 slidably moves in response to opening and closing movement of the lid 16.

To that end, a tongue and groove combination serves for securing the tray 22 to the underside of the member 36. An elongated open-ended slot 38, cut from a central section in the lower half of the member 36, serves as the groove. A T-shaped central section 40 of the tray 22, between the bumps 26, is bent downwardly to form the tongue. The tongue 40 is somewhat wider than the slot 38 to hold the tray 22 against the member 36.

The chute 20 is biased laterally against a datum or reference point 42 (FIG. 2) for the purpose of accurately delivering film to a workstation. To that end, a coil spring 44, shown in FIGS. 4A and 4B, has opposing ends connected to corresponding sides of the tongue 40 and a depending tab 45 of the member 36.

Figure 5:
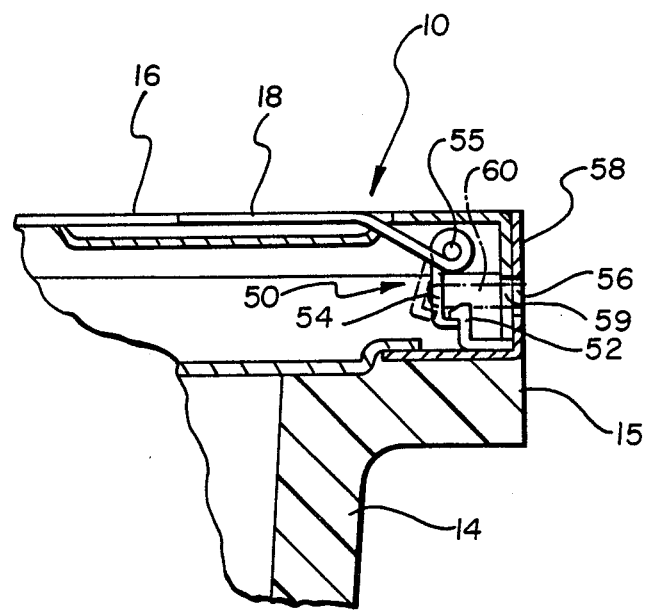
FIG. 5 is cross-sectional view of a lock for the lighttight box.

Referring now to FIG. 5, a lock 50 for the box 10 includes a stationary catch 52. A resilient fastener 54, coupled to the handle 18 around a pivot 55, serves for latching the lid 16 in its locked lighttight position. An opening 56, in a stationary faceplate 58 covering the front of the lid 16, is aligned with the fastener 54 and a corresponding opening 59 in the lid.

The lock 50 can be unlatched in either of two ways. In one way, an operator, by lifting the handles 18, causes the fastener 54 to pivot, as shown in phantom, thereby disengaging the catch 52. In a second way, a finger-like member 60, also shown in phantom and described in detail hereinbelow, protrudes into the box 10 to release fastener 54 from the catch 52.

The box 10 serves for delivering a photosensitive film sheet to, or receiving the sheet from, a film writer. To that end, a film writer 62, shown in FIG. 6, has a lighttight housing 64, including a door 66 opening to a guide track 68, from which a box 10 (not shown) is to be suspended. For that purpose, the track 68 includes a pair of rails 70 spaced to suspend the box 10 therebetween by supporting its rim 15 from below on respectively opposing sides of the box.

The film writer 62 further includes actuator apparatus 71, in accordance with the invention, for automatically opening and closing the box 10. For those purposes, the actuator apparatus 71 includes a DC gear motor 72 mounted by means of a bracket 73 to the back of a frame 74 above the guide track 68. The motor 72 serves to provide a high torque in either of two directions to drive its output shaft 76.

Figure 6:
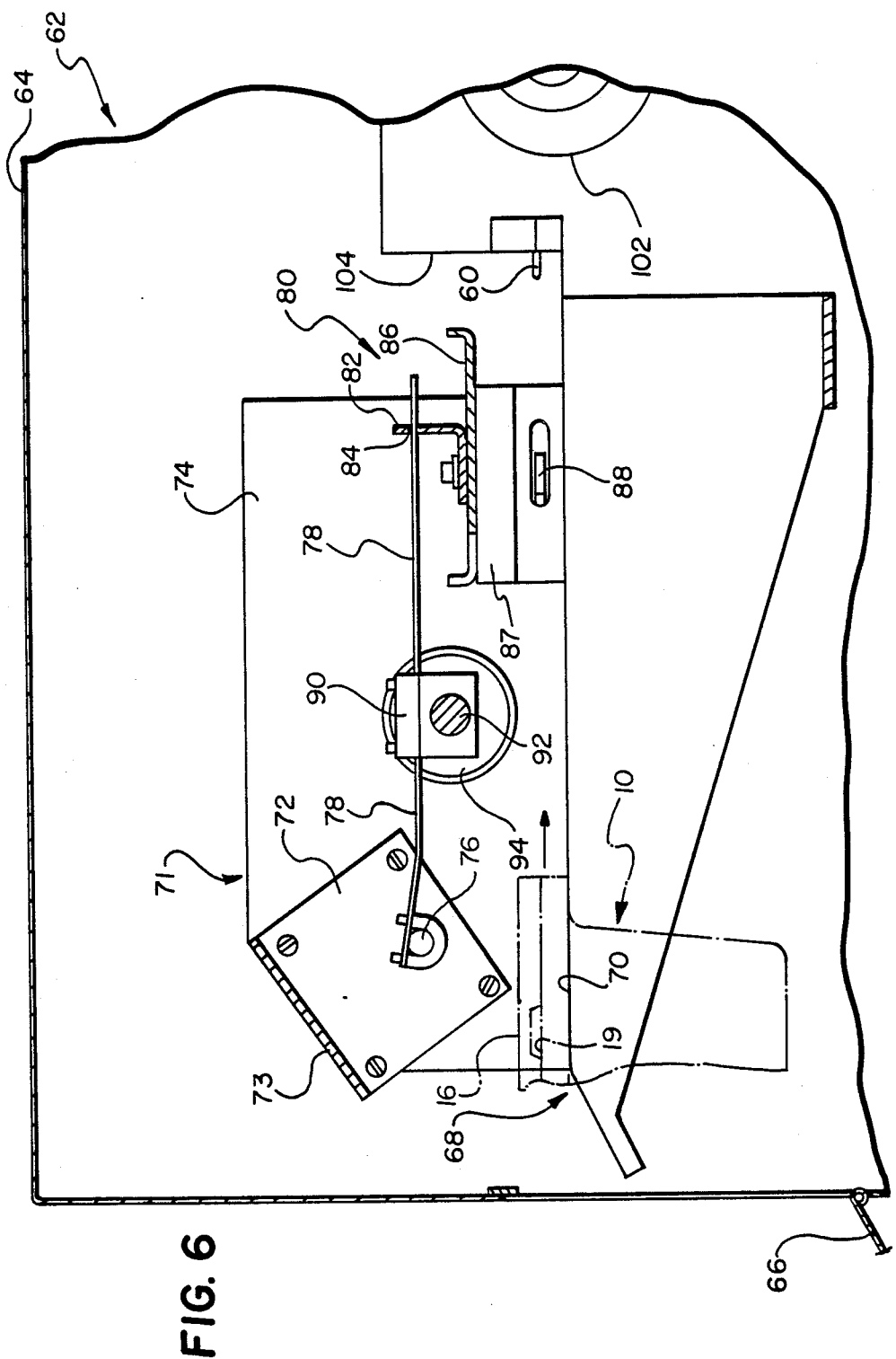
FIG. 6 is a side elevational cross-sectional view of a film writer showing cooperating actuator apparatus, in accordance with the invention, for opening and closing the lighttight box.
Figure 7:
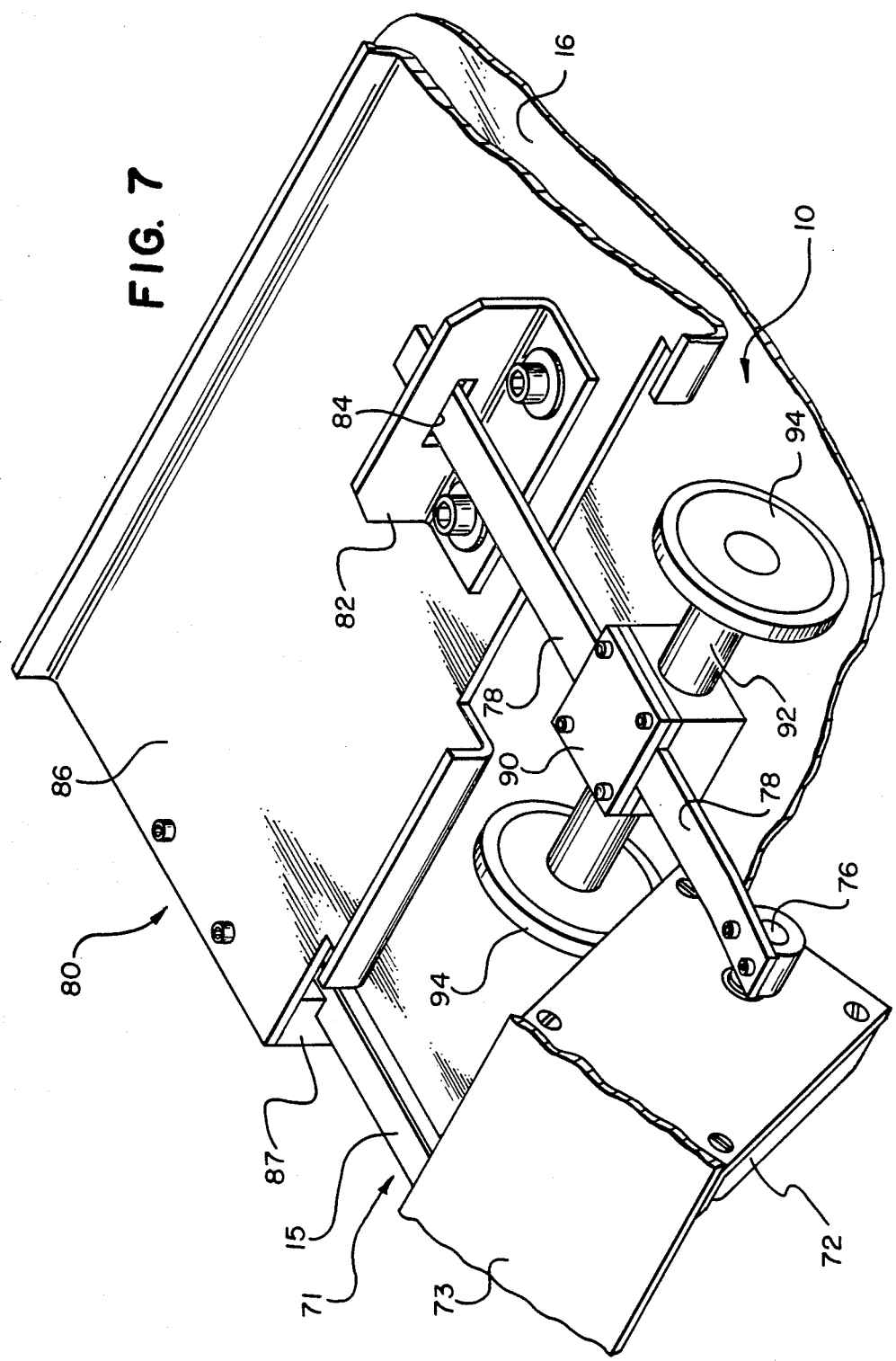
FIG. 7 is a perspective view of the actuator apparatus.

Referring now to FIG. 7, the apparatus 71 further includes an elongate lever arm 78 which acts as a leaf spring coupling the shaft 76 to a lift mechanism 80. The mechanism 80, under the control of the motor 72, serves for opening and closing the lid 16 of the box 10. To that end, the lift mechanism 80 includes a coupler 82 having a rectangular slot 84 adapted for slidably receiving the free end of the arm 78. A bridge-like frame 86, which carries the coupler 82 bolted thereto, serves for connecting the lift mechanism 80 to the lid 16 of the box 10. To that end, the frame 86 is selected to straddle the width of the box 10, with each opposing end of the frame 86 carrying a downwardly depending member 87. A spring-loaded lifting tab 88 (FIG. 6), attached to each member 87, is adapted to be seated, respectively, in the corresponding recess 19 on opposite sides of the lid 16.

In addition to coupling the motor 72 and the lift mechanism 80, the lever arm 78 also serves for securing the lid 16 in its lighttight position when the box is closed and for holding each lifting tab 88 in its corresponding recess 19 when the lid 16 is open. To those ends, a bolted housing 90, sandwiched about a central segment of the lever arm 78, carries a wheel and axle assembly. The axle, denoted 92, passes through the housing 90, below the lever arm 78 in a direction orthogonal thereto, and has an identical idler wheel 94 on each end. The diameter of each wheel 94 is selected so that each wheel presses against the lid 16 whenever the box 10 is on the portion of the track 68 that is beneath the housing 90.

In operation, an operator, in a suitable low- or no-light condition, opens the box 10 (FIG. 2) and inserts a peripheral edge of a photosensitive sheet of film into the trap 35. In doing so, an operator places the film in the box 10 with its light-sensitive surface facing upwardly. The film rests on the bumps 26 which only contact the back, non-photosensitive side of the film. With film in the box 10 and the lid 16 open, the trap 35, which captures the back peripheral edge of the film 46, and the bumps 26 cooperatively serve to lift the front peripheral edge of the film above the plane of the tray 22.

After inserting the film, denoted 100 in FIG. 3, the operator closes the lid 16. In doing so, the front peripheral edge of the backing plate 24 pivots in the clockwise direction, as viewed in the drawing, about its hinge with the lid 16. As this pivoting movement occurs, the rod 32, welded to the backing plate 24, pulls the tray 22 linearly downwardly along the ramp-like member 36 into the box 10.

When the box 10 is closed, the jaws of the clamshell, i.e. the plate 24 and the tray 22, are closed. As shown, the front-to-back dimension of the tray 22 is smaller than the corresponding dimension of the film 100. Thus, the front leading edge of the backing plate 24 and the ramp-like plate 36 actually trap the leading edge of the film 100 therebetween. In doing so, the film 100 is held in place inside the box 10 in an arch-like configuration, with contact only being made to the photosensitive surface of the film at its front and trailing border areas.

FIG. 6 illustrates the operation of loading the box 10 into the film writer 62. For that purpose, an operator opens the door 66 of the film writer 62 and loads the box 10, shown in phantom, onto the guide track 68 by suspending the box from the spaced rails 70. The operator, by reaching into the housing 64, then slides the box 10 along the rails 70, as shown by the arrow, toward a parked film-delivery position, against a stop 104. In doing so, the lid 16 and the peripheral rim 15 become wedged between the wheels 94 and the rails 70. The wheels 94 rotate across the lid 16 exerting downward pressure on the lid, as the box 10 moves into its film-delivery position.

In its parked position, the aforementioned finger-like member 60 protrudes into the box 10, thereby unlocking the box 10 by disengaging the fastener 54 from the catch 52. The door 66 serves as a safety factor because the door, when closed, would push the box 10 into its film-delivery position in the event the operator failed to do so. In the parked position, the wheels 94, by their downward pressure, maintain the lid 16, even though unlocked, in its lighttight position; also, the lift mechanism 80 attaches to the lid 16 by means of lifting tabs 88 seating in corresponding recesses 19.

Figure 8:
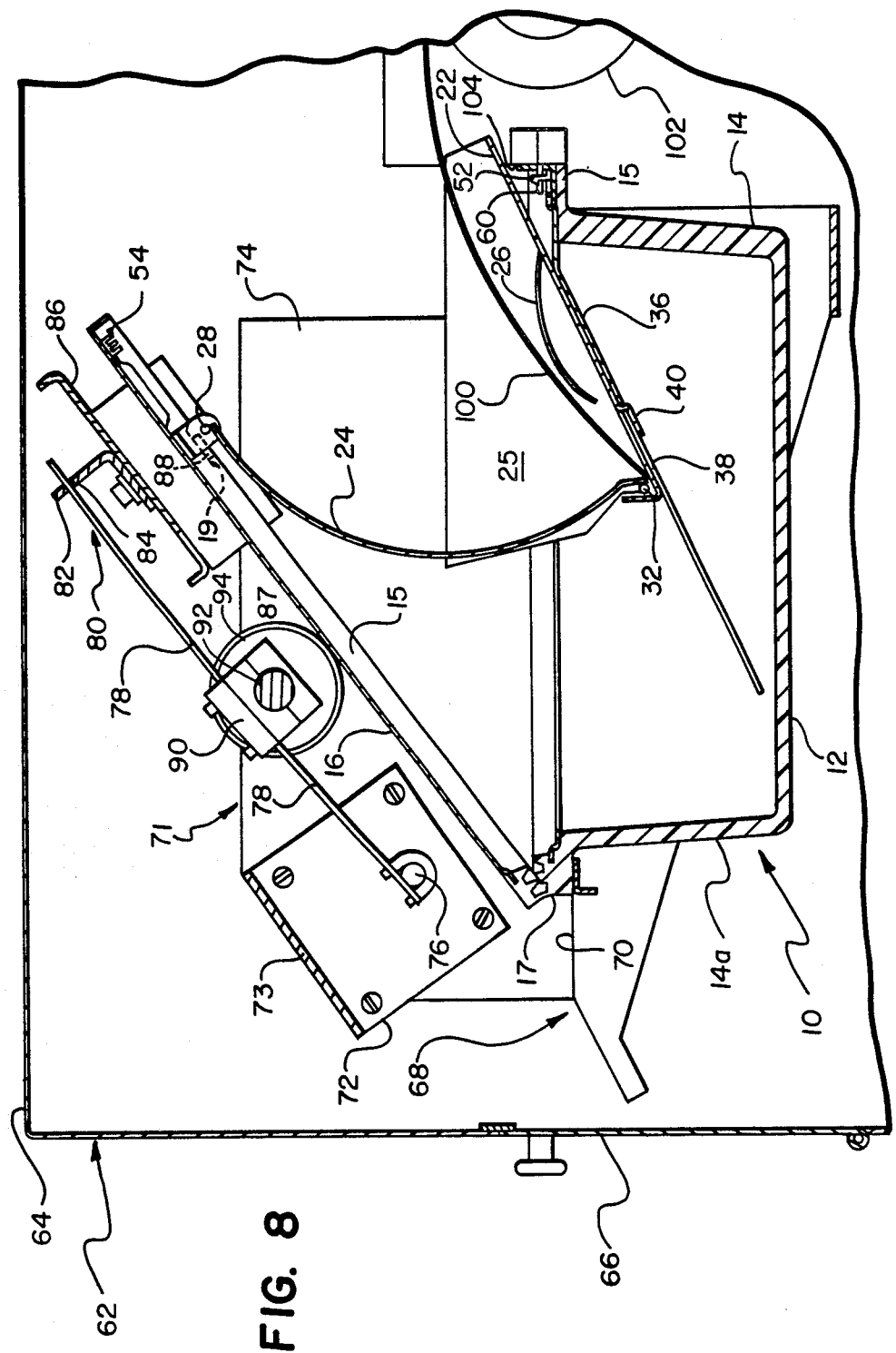
FIG. 8 is a side elevation cross-sectional view showing the actuator apparatus holding the lighttight box in an open position.

FIG. 8 illustrates the operation of opening the box 10 under the influence of the actuator apparatus 71. To open the lid 16, the DC gear motor 72 is energized (by means not shown) in a direction to drive its output shaft 76 in a counterclockwise direction, as viewed in the drawing. The lever arm 78, in response to the shaft 76, lifts the mechanism 80 upwardly along a circular path whose center coincides with the axis of the living hinge 17. Since the lever arm 78 actually pivots about the axis of the shaft 76, the difference between the radius of curvature of the lever arm and the radius of curvature of the lid 16 is compensated for by means of the coupler 82 sliding radially on the free end of lever arm 78.

During this lifting movement, the wheels 94 maintain downward pressure on the lid 16. The lever arm 78, on the other hand, exerts upward pressure on the lid 16 through the lift mechanism 80. These two competing forces serve to cooperatively hold each lifting tab 88 in its recess 19.

As initial box-opening movement occurs, the leading edge of the backing plate 24 is released from the film 100. Due to its resiliency, the front peripheral edge of the film 100 springs upwardly, under the influence of the bumps 26 and the capturing action of the trap 35, away from the plane of the ramp-like member 36. In this cantilevered position, the film 100 remains slightly arched under the influence of its own weight.

Figure 4A:
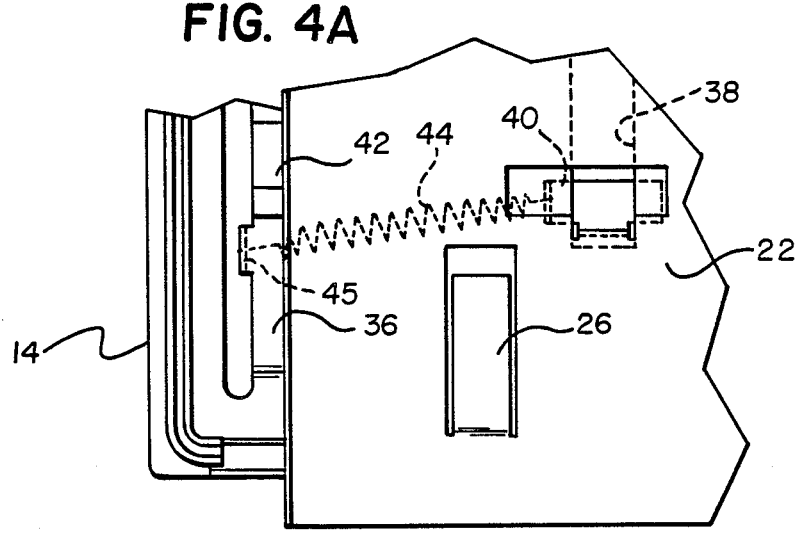
FIGS. 4A and 4B are partial top plan views of a film-carrying tray in an extended position and a retracted position, respectively.
Figure 4B:
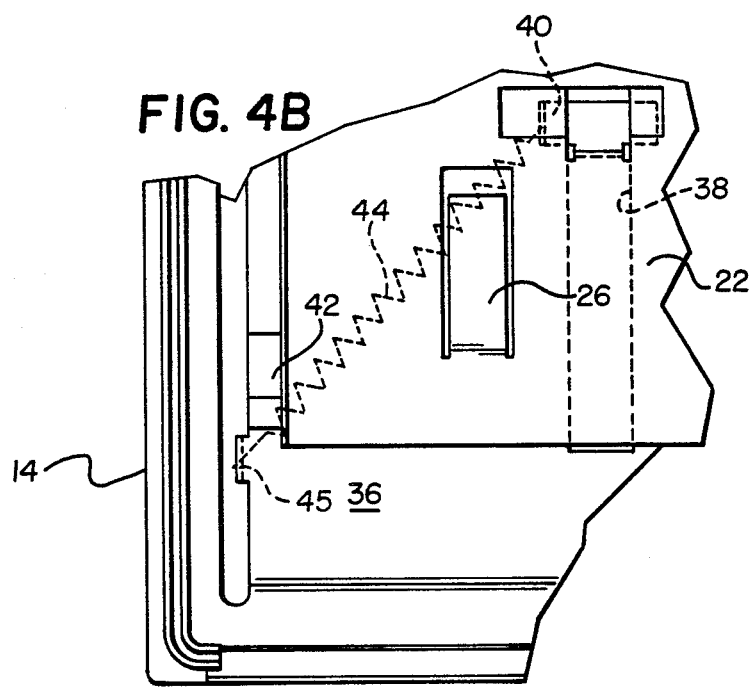

As box-opening movement continues, the lid 16 pulls the leading edge of the backing plate 24 upwardly along a circular path. At the same time, the tray 22, which is held against the underside of the member 36 by means of the tongue 40, is pushed forwardly, under the influence of circular swinging movement of the plate 24, along the ramp-like member 36. In doing so, the coil spring 44 biases the tray 22 laterally against datum 42 (FIGS. 4A and 4B).

The film 100, as described previously herein, is wider than the front-to-back dimension of the tray 22. Accordingly, the leading peripheral edge of the film 100 leads the corresponding edge of the tray 22 as the clamshell chute 20 opens. With the lid 16 in its fully open position, the tray 22 extends outwardly from the box 10, as shown in FIG. 8. The film 100, of course, extends not only beyond the leading edge of the tray 22, but is raised relative thereto under the influence of the bumps 26. This facilitates entry of the peripheral edge of the film 100 into the nip of a leading-edge clamp (not shown) of the drum mechanism 102.

Reference is hereby made to U.S. patent application Ser. No. 07/167,928, entitled SHEET HANDLING APPARATUS, now U.S. Pat. No. 4,807,867 and assigned to the assignee of the subject invention, for descriptive details of the manner in which a drum, such as mechanism 102, loads a film sheet from a tray, such as tray 22, for an exposure and, in turn, returns the film to the tray following an exposure.

To retrieve the box 10 from the film writer 62, the DC motor 72 is energized in a direction to drive the shaft 76 in the clockwise direction. In doing so, the lever arm 78 lowers the lift mechanism 80, which, in turn, closes the lid 16. The motor 72 is arranged to slightly overdrive the lever arm 78, so that both the mechanism 80 and the wheels 94 press the lid into its lighttight position. In doing so, the motor 72 is stalled slowly to reduce shock forces as the box 10 closes.

With the motor 72 deenergized, an operator then reaches into the housing 64 through the open door 66 and pulls the box 10 toward the door, along the tracks 70 free of the lifting tabs 88. The wheels 94 assure that the lid is held in its lighttight position as the operator retrieves the box 10 from the film writer 62.

From the foregoing, it will be clear to those skilled in the art that box 10 and the actuator apparatus 71 offer clear and distinct advantages for delivering a sheet of film to a workstation. For example, by arching the film and raising it relative to the mouth of a clamshell film-delivering chute, design tolerances can be relaxed for parking the box relative to a workstation when the film is actually delivered thereto; moreover, by arching a film sheet, its full leading edge can be moved more readily into abutting engagement with a receiving surface of a workstation if the sheet is misaligned on delivery.

The invention has been described in detail with reference to the figures; however, it will be appreciated that variations and modifications are possible within the spirit and scope of the invention.

What is claimed is:

1. Actuator apparatus for a lighttight film-delivery box of the type having a lid movable between a closed lighttight position and an open position, and a clamshell mechanism, connected to said lid and arranged to carry a film sheet, having (1) a retracted position internal to said box when said lid is in its lighttight position, and (2) an open film-delivery position external to said box when said lid is in its open position, said actuator apparatus including:
  (a) a control mechanism, attachable to said lid when said lighttight box is placed in a parked film-delivery position relative to a workstation, movable between (1) a rest position in which said lid is secured against movement from its closed position, and (2) an actuated position in which said lid is held in its open position; and
  (b) energizable motor means, including an output connected to said control mechanism, having (1) a first deenergized state in which said output holds said control mechanism in its rest position whereby said clamshell mechanism is in its retracted position, and (2) a second energized state in which said output moves said control mechanism to its actuated position whereby said clamshell mechanism assumes its open position to deliver a film sheet carried thereby to the aforementioned workstation.

2. Actuator apparatus for a lighttight film-delivery box of the type having a lid movable between a closed lighttight position and an open position, means for latching said lid in its lighttight position, and a clamshell mechanism, connected to said lid and arranged to carry the film sheet, having (1) a retracted position internal to said box when said lid is in its lighttight position, and (2) an open film-delivery position external to said box when said lid is in its open position, said actuator apparatus including:
  (a) a finger-like member arranged to cause said latching means to unlatch said lid when said lighttight box is placed in a parked film-delivery position adjacent to a workstation;
  (b) a lift mechanism connectable to said lid when said lighttight box is in its parked position;
  (c) a roller assembly couplable to said lid when said film-delivery box is in its parked position;
  (d) a spring-based control arm, coupled to said lift mechanism and connected to said roller assembly, mounted for movement between (1) a tensioned position in which said roller assembly secures said lid against movement from its lighttight position, and (2) an actuated position in which said control arm holds said lid in its open position; and
  (e) energizable motor means, including an output connected to said control arm, having (1) a first deenergized state in which said output positions said control arm in its tensioned position to thereby cause said roller assembly to secure said lid against movement from its lighttight position, and (2) a second energized state in which said output positions said control arm in its actuated position wherein said clamshell mechanism, under cooperative action of said lift mechanism and said lid, assumes its open position to deliver a film sheet carried thereby to a workstation.

3. Actuator apparatus for a lighttight film-delivery box of the type having a major surface movable between a closed lighttight position and an open position, a tray arranged to carry a sheet of film, and a linkage, coupling said major surface and said tray, and responsive to movement of said major surface from its closed lighttight position to its open position, to move said tray, respectively, from an initial position internal to said box to a final position external to said box, said actuator apparatus including:
  (a) a control mechanism, attachable to said major surface when said lighttight box is placed in a parked film-delivery position relative to a workstation, movable between (1) a rest position in which said major surface is secured against movement from its closed position, and (2) an actuated position in which said major surface is held in its open position; and
  (b) energizable motor means, including an output connected to said control mechanism, having (1) a first deenergized state in which said output holds said control mechanism in its rest position whereby said tray is in its position internal to said box, and (2) a second energized state in which said output moves said control mechanism to its actuated position whereby said tray assumes its position external to said box to deliver a film sheet carried thereby to a workstation.

4. Actuator apparatus for a lighttight film-delivery box of the type having a major surface movable between a closed lighttight position and an open position, means for latching said major surface in its lighttight position, a tray arranged to carry a sheet of film, and a linkage, coupling said major surface and said tray, for moving said tray between (1) a retracted position internal to said box when said major surface is in its lighttight position, and (2) an open film-delivery position external to said box when said major surface is in its open position, said actuator apparatus including:
  (a) a finger-like member arranged to cause said latching means to unlatch said major surface when said lighttight box is placed in a parked film-delivery position adjacent to a workstation;
  (b) a movable member connectable to said major surface when said lighttight box is in its parked position;
  (c) a roller assembly engageable with said major surface when said film-delivery box is in its parked position;
  (d) a control arm, coupled to said movable member and connected to said roller assembly, mounted for movement between (1) a tensioned position in which said roller assembly secures said major surface against movement from its closed position, and (2) an actuated position in which said movable member holds said major surface in its open position; and
  (e) energizable motor means, including an output connected to said control arm, having (1) a first deenergized state in which said output positions said control arm in its tensioned position to cause said roller assembly to secure said major surface against movement from its closed position, and (2) a second energized state in which said output positions said control arm in its actuated position wherein said tray, under cooperative action of said movable member and said major surface, assumes its open position to deliver a film sheet carried thereby to a workstation.

* * * * *